May 4, 1926.
J. C. EMLEY ET AL
1,583,537
BAKER'S OVEN
Original Filed June 7, 1922   2 Sheets-Sheet 1
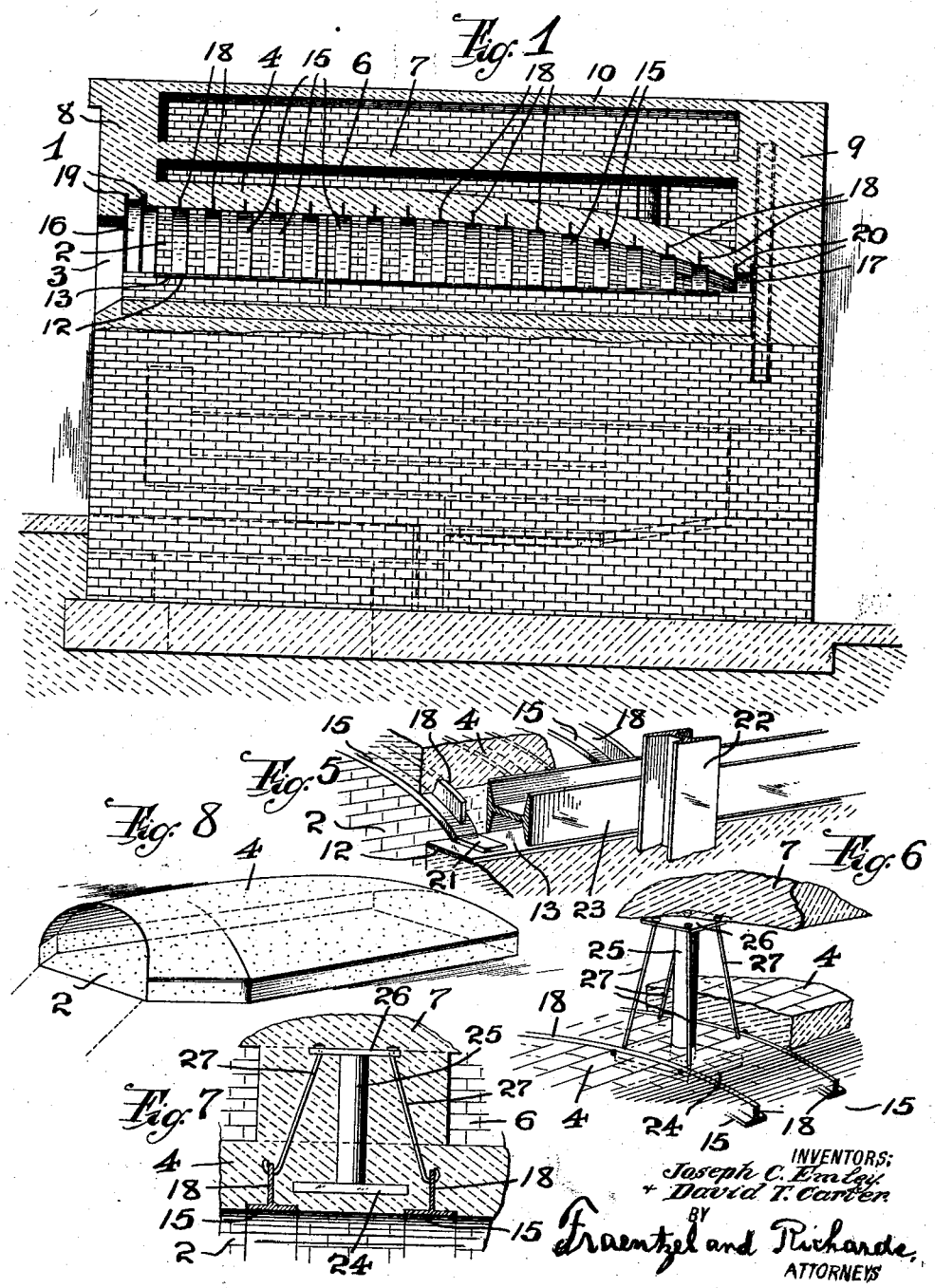

May 4, 1926.
J. C. EMLEY ET AL
1,583,537
BAKER'S OVEN
Original Filed June 7, 1922    2 Sheets-Sheet 2
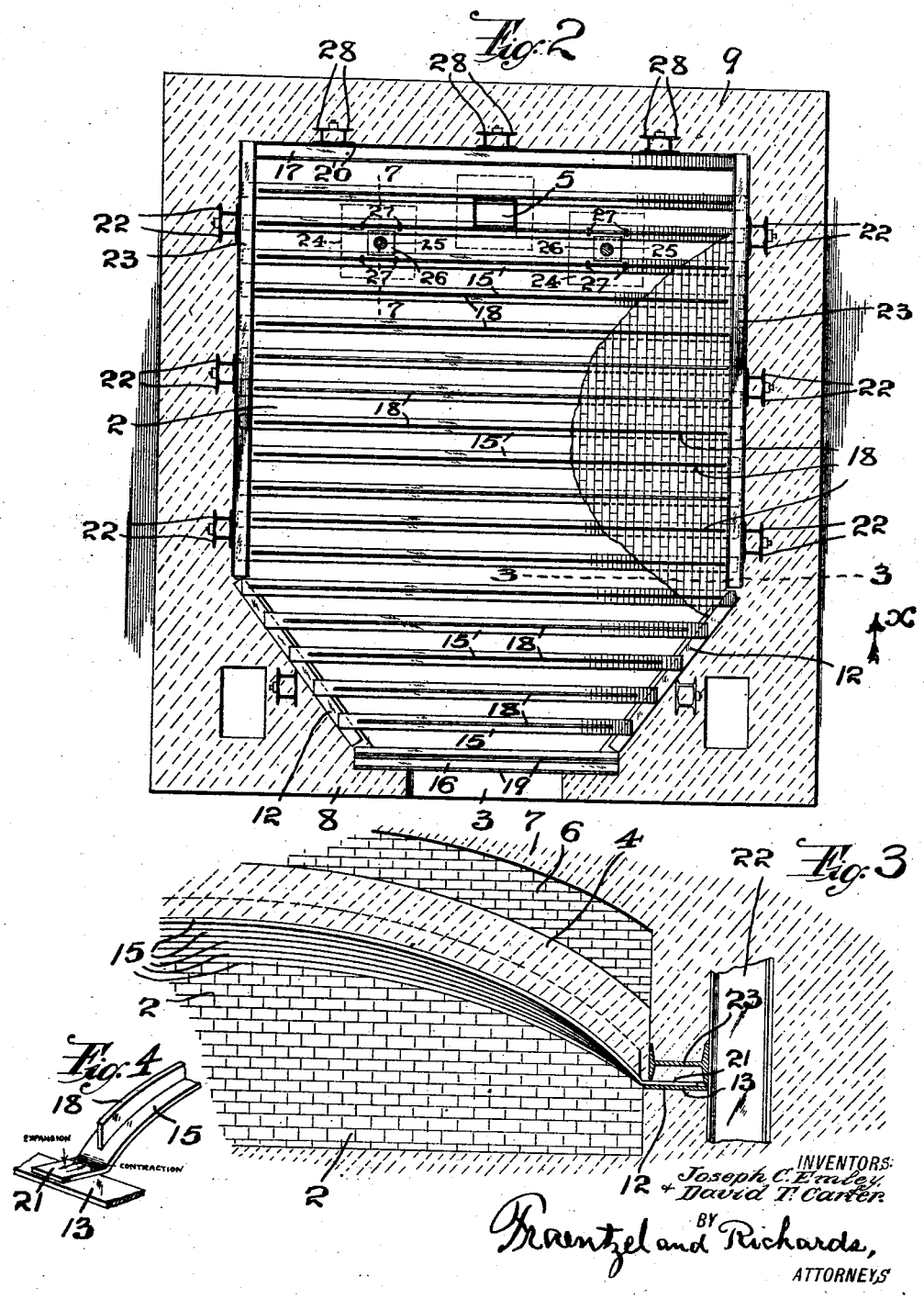
INVENTORS:
Joseph C. Emley
+ David T. Carter
BY Kraentzel and Richards,
ATTORNEYS Patented May 4, 1926.

1,583,537

UNITED STATES PATENT OFFICE.

JOSEPH C. EMLEY, OF PHILADELPHIA, PENNSYLVANIA, AND DAVID T. CARTER, OF NEW YORK, N. Y.

BAKER'S OVEN.

Application filed June 7, 1922, Serial No. 566,513. Renewed March 4, 1926.

*To all whom it may concern:*

Be it known that we, JOSEPH C. EMLEY and DAVID T. CARTER, citizens of the United States, residing at Philadelphia, in the county of Philadelphia and State of Pennsylvania, and New York, in the county of New York and State of New York, respectively, have invented certain new and useful Improvements in Bakers' Ovens; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in ovens; and the present invention has reference, more particularly, to an improved baker's oven in which the usual arch is provided with a novel and simply constructed supporting means which reinforces and strengthens the arch of the baking chamber of the oven, and prevents cracking, sagging, and other damage to the arch, as is at present the case with bakers' ovens as ordinarily constructed.

The present invention, therefore, has for its principal objects to provide a baker's oven of the usual shape and construction with an arch-re-inforcing and strengthening means for the purpose above stated, and one in which the possibility of small particles of the material employed in the arch-construction dropping down upon the floor of the baking chamber and upon the loaves of bread or cake in said chamber is entirely overcome.

The invention has for its further object to provide a novel and simple constructed arch re-inforcing and supporting means of the general character hereinafter more fully described and for the purpose herein-above stated, which is constructed and arranged in such a manner, that expansion and contraction are fully taken care without deterioration to the arch and side-walls of the baking chamber of the oven.

Other objects of the present invention not at this time more particularly enumerated will be clearly understood from the following detailed description of the said invention.

With the various objects of the present invention in view, the said invention consists, primarily, in the novel baker's oven hereinafter more fully set forth; and, the said invention consists, furthermore, in the general arrangements and combinations of the various devices and parts, as well as in the details of the construction of the said parts all of which will be more fully described in the following specification, and then finally embodied in the clauses of the claims which are appended to, and which form an essential part of the said specification.

The invention is fully illustrated in the accompanying drawings, in which:—

Figure 1 is a longitudinal vertical sectional representation of a baker's oven provided with an arch-supporting and re-inforcing means made according to and embodying the principles of the present invention; and Figure 2 is a horizontal sectional representation of the oven, said section being taken directly beneath the arch of the baking chamber, said view showing more particularly in plan, the general arrangement of the arch-supporting and re-inforcing means, Figure 3 is a detail vertical sectional representation, taken on line 3—3 in said Figure 2, looking in the direction of the arrow $x$, said view being made on an enlarged scale; Figures 4, 5 and 6 are detail views, in perspective, of different portions of the arch-supporting and re-inforcing means, and portions of the masonry of the oven; and Figure 7 is a transverse vertical sectional representaton, taken on line 7—7 in said Figure 2.

Figure 8 is a perspective view, showing diagrammatically, the general shape of the baking chamber of the oven, and the arch thereof, which is to be supported and re-inforced in the manner of the principles of the present invention.

Similar characters of reference are employed in all of the said above described views, to indicate corresponding parts.

Referring now to the said drawings, the reference-character 1 indicates a baker's oven of any usual construction, of which 2 indicates the baking chamber, and 3 the usual opening of the said chamber, this opening being adapted to be closed by the usual door or doors, which however are not shown in the drawings. This chamber, as will be seen from an inspection of the several figures of the drawings is provided with the usual form and construction of arch 4, termed the lower arch, and which is curved transversely, as indicated in Figures 3 and 8 of the drawings, and also curves longitudinally with relation to the oven, toward the rear of the oven, so that the rear portion of the baking chamber is considerably lower than the front portion of the chamber, as will be readily understood from an inspection of Figures 1 and 8 of the drawings. At the rear, the said chamber 2 is provided with the usual heat-inlet or opening 5 which is in communication with the usual and well-known heat-conveying flue or flues leading from the usual fire-chamber of the oven, as will be clearly understood.

Above this lower arch 4 of the chamber 2 is the usual hollow space 6 of the oven, said space providing the usual heat-chamber for heating the arch 4 and by radiation conveying the heat to the baking chamber 2. Above which is the usual upper arch 7, the reference-characters 8 and 9 indicating the usual end-walls, and 10 is the usual top of the oven, all of said members being of the usual masonry, as brick and cement, or the like.

Now, it has been found in practice, that with the excessive heat continuously conveyed to the baking chamber 2, very often its arch 4 will sag or crack, causing particles of the materials employed in the masonry of the arch to drop down upon the floor of the baking chamber, and also upon the bread or cake being baked in said chamber, and to avoid these objectionable conditions, we have provided the oven with an arch-supporting and re-inforcing means of the general construction to be presently described, and which, we claim, overcomes the objections now existing in the general constructions of bakers' ovens.

As shown, contiguous to the side-walls and the front portions of the baking chamber 2, the masonry is formed with side-ledges 11 and forwardly extending ledges 12, said ledges 12 being angularly disposed and terminating at or near the front opening 3 of the baking chamber, substantially as shown in Figure 2 of the drawings. Suitably disposed upon the said ledges 11 are supporting plates 13 of metal, and disposed upon the forwardly extending ledges 12 are other supporting plates 14. Extending laterally across the baking chamber 2 are upwardly convexed supporting beams 15, all of said beams, except the first and last end-beams 16 and 17, being formed with an upwardly extending and correspondingly convexed rib, as 18, but the said end-beams 16 and 17 each being formed with a pair of upwardly extending and correspondingly convexed ribs 19 and 20, respectively. As shown in said Figures 1 and 3, the beams 15 are variously curved or convexed, so as to conform to the various arcs of the arch of the baking chamber, said beams 15 being also of different lengths, corresponding to the marginal configuration of the baking chamber 2, as clearly indicated in Figure 2 of the drawings.

At their opposite end-portions, the said supporting beams 15 are made with the angularly disposed supporting end-members 21, which are placed in supported relation upon the respective supporting plates 13 and 14, as clearly indicated in Figures 1, 2, 3, 4 and 5 of the drawings. Contiguous to the side-ledges 11 and the supporting plates 13 thereon, and imbedded in the masonry of the oven are suitably shaped uprights or posts, as 22, and resting upon the end-members 21 of the various supporting beams 15, placed upon said supporting plates 13, and adjacent to said uprights or posts 22, are rearwardly exending buck-stays or beams, as 23, which are also suitably imbedded in the masonry of the oven.

From an inspection of Figure 1 of the drawings, it will be seen that the narrow supporting beams 15 are partially imbedded in the arch or crown 4 above the baking chamber 2, so that there will be no metal exposed at the upper surface of the arch or crown to the direct heat within the heat-chamber 6. The purpose of this is to prevent giving to the top of the baking chamber two distinct heats, it being well understood, that the metal or steel employed will conduct its heat to the baking chamber much quicker than will the masonry of the arch or crown, the steel producing what is termed "flash heat", and which, if produced, causes the top of the bread to sear and drop down into the pan. The heat from the steel pulls the moisture out of the bread dough too quickly, and not as slowly as the heat from the brick-arch or crown. Therefore, in order to avoid the production of too quick a heat within the baking chamber of the oven, it is very desirable that no metal surfaces shall be exposed at the top of the arch or crown 4 to the heat within the chamber 6, and for which reason, the supporting beams 15 and their ribs 18 are imbedded in the brick-work of the arch or crown 4 in the manner illustrated in said Figure 1 of the drawings.

At either side of the previously mentioned heat-inlet or flue, 5 see Figure 2, and suitably disposed between the lower arch 4 and the upper arch 7 are other strengthening anchors or supporting means, substantially as shown in Figures 6 and 7 of the drawings, each means comprising a plate 24 imbedded in the masonry between two of the said convexed supporting beams 15, each plate 24 having an upwardly extending post 25, with the upper end-portion of which is connected another plate 26, likewise imbedded in the masonry of the oven, and in supporting relation with the upper arch 7. Extending from the said plate 26 are suitable tie-rods, as 27, said tie-rods having their lower ends suitably connected with the ribs of the adjacent supporting beams 15. If desired, these tie-rods may also be suitably imbedded in the masonry located between the two arches 4 and 7, substantially as represented in said Figure 7 of the drawings.

A series of uprights or posts 28, contiguous to the end-beam 17 may also be placed in the masonry of the rear wall of the oven, as indicated in Figures 1 and 2 of the drawings.

The many advantages of the present invention will be clearly evident from the foregoing description of the present invention, and from an inspection of the several figures of the drawings, the supported relation of the end-portions of the various arch-beams 15 upon the plates 13 and 14 being such that the expansion and contraction of the various metal elements or members is properly taken care of, so that there will be no sagging or cracking of the masonry constituting the arch 4 of the baking chamber 2.

We are fully aware, of course, that changes may be made in the general arrangements and combinations of the several devices and parts, as well as in the details of the construction of the several parts, without departing from the scope of the present invention as set forth in the foregoing specification, and as defined in the clauses of the claims which are appended thereto. Hence we do not limit our present invention to the exact arrangements and combinations of the several devices and parts as described in the said specification, nor do we confine ourselves to the details of the construction of the said parts, as illustrated in the accompanying drawings.

We claim:—

1. A baker's oven comprising a baking chamber formed with ledges and an arch of masonry, supporting plates disposed upon said ledges, combined with an arch-supporting means comprising a series of transversely disposed and arch-shaped supporting beams of metal having angularly extending and flat end-members resting upon said supporting plates for expansion and contraction, said beams having upwardly extending arc-shaped ribs, the arc-shaped portions of the beams and said ribs being imbedded in said arch so as to be non-exposed from the upper surface of the arch, and also for re-inforcing and supporting the arch.

2. A baker's oven comprising a baking chamber formed with ledges and an arch of masonry, supporting plates disposed upon said ledges, combined with an arch-supporting means comprising a series of transversely disposed and arch-shaped supporting beams of metal having angularly extending and flat end-members resting upon said supporting plates for expansion and contraction, said beams having upwardly extending arc-shaped ribs, the arc-shaped portions of the beams and said ribs being of different curvature and being imbedded in said arch so as to be non-exposed from the upper surface of the arch, and also for re-inforcing and supporting the arch.

3. A baker's oven comprising a baking chamber formed with ledges and an arch of masonry supporting plates disposed upon said ledges, combined with an arch-supporting means comprising a series of transversely disposed and arch-shaped supporting beams of metal having angularly extending and flat end-members resting upon said supporting plates for expansion and contraction, said beams having upwardly extending arc-shaped ribs, the arc-shaped portions of the beams and said ribs being imbedded in said arch so as to be non-exposed from the upper surface of the arch, and also for re-inforcing and supporting the arch, and said beams and ribs being of different lengths.

4. A baker's oven comprising a baking chamber formed with ledges and an arch of masonry, supporting plates disposed upon said ledges, combined with an arch-supporting means comprising a series of transversely disposed and arc-shaped supporting beams of metal having angularly extending and flat end-members resting upon said supporting plates for expansion and contraction, said beams having upwardly extending arc-shaped ribs, the arc-shaped portions of the beams and said ribs being of different curvature and being imbedded in said arch so as to be non-exposed from the upper surface of the arch, and also for re-inforcing and supporting the arch, and said beams and ribs being of different lengths.

5. A baker's oven comprising a baking chamber having an arch of masonry, and said oven being formed with a second arch above said first-mentioned arch, anchoring devices between and connected with said arches, combined with an arch-supporting means of metal imbedded in said first-mentioned arch so as to be non-exposed from the upper surface of the arch, and also for re-inforcing and supporting the same.

6. A baker's oven comprising a baking chamber having an arch of masonry, and said oven being formed with a second arch above said first-mentioned arch, anchoring devices between and connected with said arches, combined with an arch-supporting means comprising a series of transversely disposed and arc-shaped supporting beams of metal imbedded in said first-mentioned arch so as to be non-exposed from the upper surface of the arch, and also for re-inforcing and supporting the same.

7. A baker's oven comprising a baking chamber having an arch of masonry, and said oven being formed with a second arch above said first-mentioned arch, anchoring devices between and connected with said arches, combined with an arch-supporting means comprising a series of transversely disposed and arc-shaped supporting beams of metal imbedded in said first-mentioned arch so as to be non-exposed from the upper surface of the arch, and also for re-inforcing and supporting the same, and the said beams being of different lengths.

8. A baker's oven comprising a baking chamber having an arch of masonry, and said oven being formed with a second arch above said first-mentioned arch, combined with arch-supporting means comprising a series of transversely disposed and arc-shaped beams imbedded in said first-mentioned arch for re-inforcing and supporting the same, and anchoring devices between and connected with said arches, each anchoring device comprising a post, end-plates connected with the respective ends of said post, and tie-rods connected at one end with one of said end-plates and at their other ends with the beams adjacent to the other end-plate.

9. A baker's oven comprising a baking chamber having an arch of masonry, and said oven being formed with a second arch above said first-mentioned arch, combined with arch-supporting means comprising a series of transversely disposed and arc-shaped beams of different curvatures, imbedded in said first-mentioned arch for re-inforcing and supporting the same, and anchoring devices between and conected with said arches, each anchoring device comprising a post, end-plates connected with the respective ends of said post, and tie-rods connected at one end with one of said end-plates and at their other ends with the beams adjacent to the other end-plate.

In testimony, that we claim the invention set forth above we have hereunto set our hands.

JOSEPH C. EMLEY.
DAVID T. CARTER.